United States Patent [19]

Manico et al.

[11] Patent Number: 5,689,610

[45] Date of Patent: Nov. 18, 1997

[54] METHOD OF MAKING AN INDEX PRINT HAVING AN INDICATOR OF SUBSTANTIALLY WHERE AN IMAGE IS STORED ON A MOTION PICTURE IMAGE RECORDING MEDIUM

[75] Inventors: Joseph Anthony Manico, Rochester; David Lynn Patton, Webster; John Randall Fredlund; Peter Albert Frosig, both of Rochester; Raymond Eugene Wess, Holley, all of N.Y.

[73] Assignee: Eastman Kodak Company, Rochester, N.Y.

[21] Appl. No.: 262,193

[22] Filed: Jun. 20, 1994

[51] Int. Cl.⁶ .................................................. H04N 5/76
[52] U.S. Cl. ........................ 386/46; 386/52; 348/552; 348/601
[58] Field of Search ..................... 358/335, 342, 358/310, 311, 906; 348/578, 552, 600, 601, 584; 360/13, 14.1, 14.2, 14.3, 15, 33.1, 35.1; 386/46, 52, 55, 57, 64, 125; H04N 5/76, 5/78

[56] References Cited

U.S. PATENT DOCUMENTS

| | | | |
|---|---|---|---|
| 4,290,524 | 9/1981 | Azar | 206/232 |
| 4,339,769 | 7/1982 | Fujita et al. | 358/6 |
| 4,468,693 | 8/1984 | Fujita et al. | 358/78 |
| 4,694,357 | 9/1987 | Rahman et al. | 360/9.1 |
| 4,805,039 | 2/1989 | Otake et al. | 358/335 |
| 4,920,423 | 4/1990 | Shiota | 358/335 |
| 4,939,581 | 7/1990 | Shalit | 358/244 |
| 4,965,662 | 10/1990 | Shiota | 358/78 |
| 5,046,167 | 9/1991 | Nakano et al. | 358/335 |
| 5,111,291 | 5/1992 | Erickson et al. | 358/108 |
| 5,122,886 | 6/1992 | Tanaka | 358/335 |
| 5,126,888 | 6/1992 | Schranz | 360/27 |
| 5,157,511 | 10/1992 | Kawai et al. | 358/335 |
| 5,177,645 | 1/1993 | Lemelson | 360/35.1 |
| 5,179,449 | 1/1993 | Doi | 358/335 |
| 5,208,745 | 5/1993 | Quentin et al. | 364/188 |
| 5,231,546 | 7/1993 | Shimada | 360/60 |
| 5,258,880 | 11/1993 | Takahashi | 360/79 |

OTHER PUBLICATIONS

HP VidJet Pro, Hewlett-Packard Company.

*Primary Examiner*—Khoi Truong
*Attorney, Agent, or Firm*—Charles E. Snee, III; David A. Howley

[57] ABSTRACT

An index print includes a recording sheet having a plurality of imagettes representing images stored on a motion picture image recording medium such as a video tape. The plurality of imagettes are less in number than an entire number of images stored on the video tape. An indicator, such as a time or count from the beginning of the video tape, is provided on the recording sheet adjacent the imagettes for indicating substantially where images, corresponding to the imagettes, are stored on the video tape.

6 Claims, 4 Drawing Sheets

METHOD OF MAKING AN INDEX PRINT HAVING AN INDICATOR OF SUBSTANTIALLY WHERE AN IMAGE IS STORED ON A MOTION PICTURE IMAGE RECORDING MEDIUM

FIELD OF THE INVENTION

The invention relates generally to the field of motion picture imaging, and, in particular, to an index print having an indicator of substantially where an image is stored on a motion picture image recording medium.

BACKGROUND OF THE INVENTION

U.S. Pat. No. 4,805,039, issued on Feb. 14, 1989 in the names of Otake et al., discloses an index sheet formed of one recording sheet on which are printed, as small-size positive images in parallel rows, a plurality of scenes recorded on an image recording medium such as a photographic film, a video cassette, or a video disc. The small positive images are arranged in the same order they were taken, and frame numbers are printed in juxtaposition with the respective positive images.

For a magnetic or optical image recording medium for a very large number of images, a lesser plurality of scenes read out are edited in such a manner as to arrange them in a representative sample and thereafter are printed on a recording sheet. This index sheet can be part of a package comprising a container having a casing formed with at least one recess for the image recording medium and a cover swingably mounted on the casing. A transparent pocket formed on the outer or inner side of the cover contains the index sheet.

An advantage of the index sheet is that it allows a viewer of the index sheet to determine at a glance which images are stored on an image recording medium. This is quite useful for image recording mediums such as video tape and optical disk whose images are readily viewable without the aid of a machine. The viewer can quickly locate the image recording medium containing the desired images by looking at the index sheet. There is no need for the viewer to load the image recording medium into a viewer to find the desired images by trial and error.

Typical consumer NTSC, PAL, SECAM and other formats of video tape recorders and camcorders record still images at a rate of about thirty per second. This rate of recording translates into approximately 648,000 still images on one six hour VHS tape. A problem with the index sheet disclosed in Otake is that there is no indicator provided on the recording sheet adjacent any of the small positive images for indicating where the corresponding image on the image recording medium is located. With hundreds of thousands of images stored on a video tape or optical disk, it would take a great deal of time and much trial and error for a viewer to locate an image stored on the tape or disk by looking at the corresponding small positive image (imagette) on the Otake index sheet.

SUMMARY OF THE INVENTION

The present invention is directed to overcoming one or more of the problems set forth above. Briefly summarized, according to one aspect of the present invention, an index print includes a recording sheet having a plurality of imagettes representing images stored on a motion picture image recording medium. The plurality of imagettes are less in number than an entire number of images stored on the motion picture image recording medium. An indicator is provided on the recording sheet adjacent at least one of the imagettes for indicating substantially where an image, corresponding to the at least one imagette, is stored on the motion picture image recording medium.

By providing an indicator on the recording sheet adjacent at least one of the imagettes for indicating where an image, corresponding to the at least one imagette, is stored on the motion picture image recording medium, a viewer of the image recording medium will be able to quickly and precisely locate that image on the image recording medium without wasting time and without trial and error.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
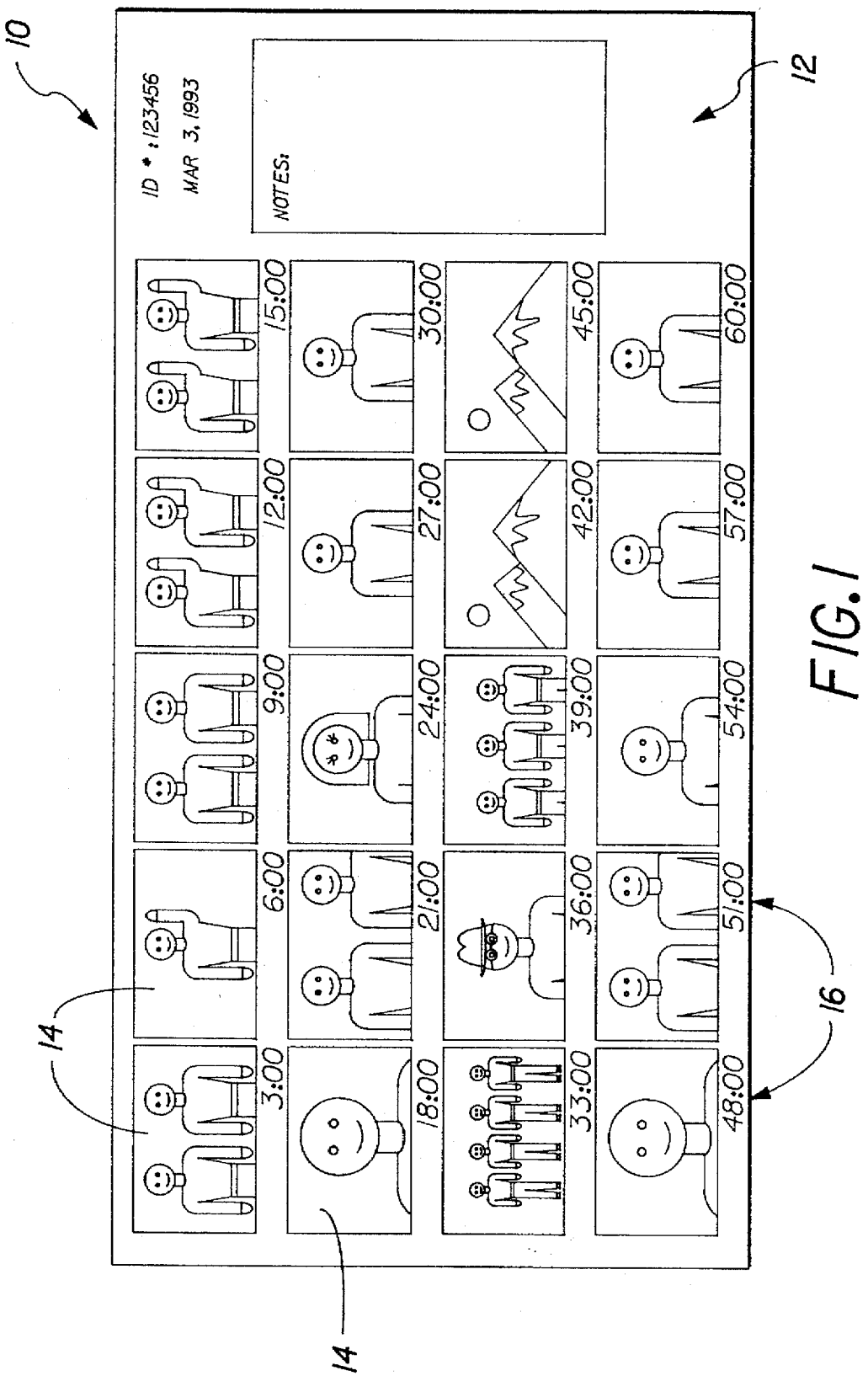
FIG. 1 is a schematic representation of an index print including a plurality of imagettes.

Beginning with FIG. 1, an index print 10 includes a recording sheet 12 on which are located a plurality of imagettes 14. Each imagette represents an image stored on a motion picture image recording medium (MPIRM) such as a video cassette tape or an optical disk. Below each imagette is located an indicator 16 for indicating substantially where the corresponding image on the MPIRM is located. In this embodiment, the indicator is the video cassette recorder time or count that each image is located from the beginning of a video cassette tape. The images corresponding to the imagettes are located at multiples of three minutes or 180 counts from the beginning of the tape. As such, a viewer of the index print can quickly determine where an image is located on the video cassette tape.

Figure 2:
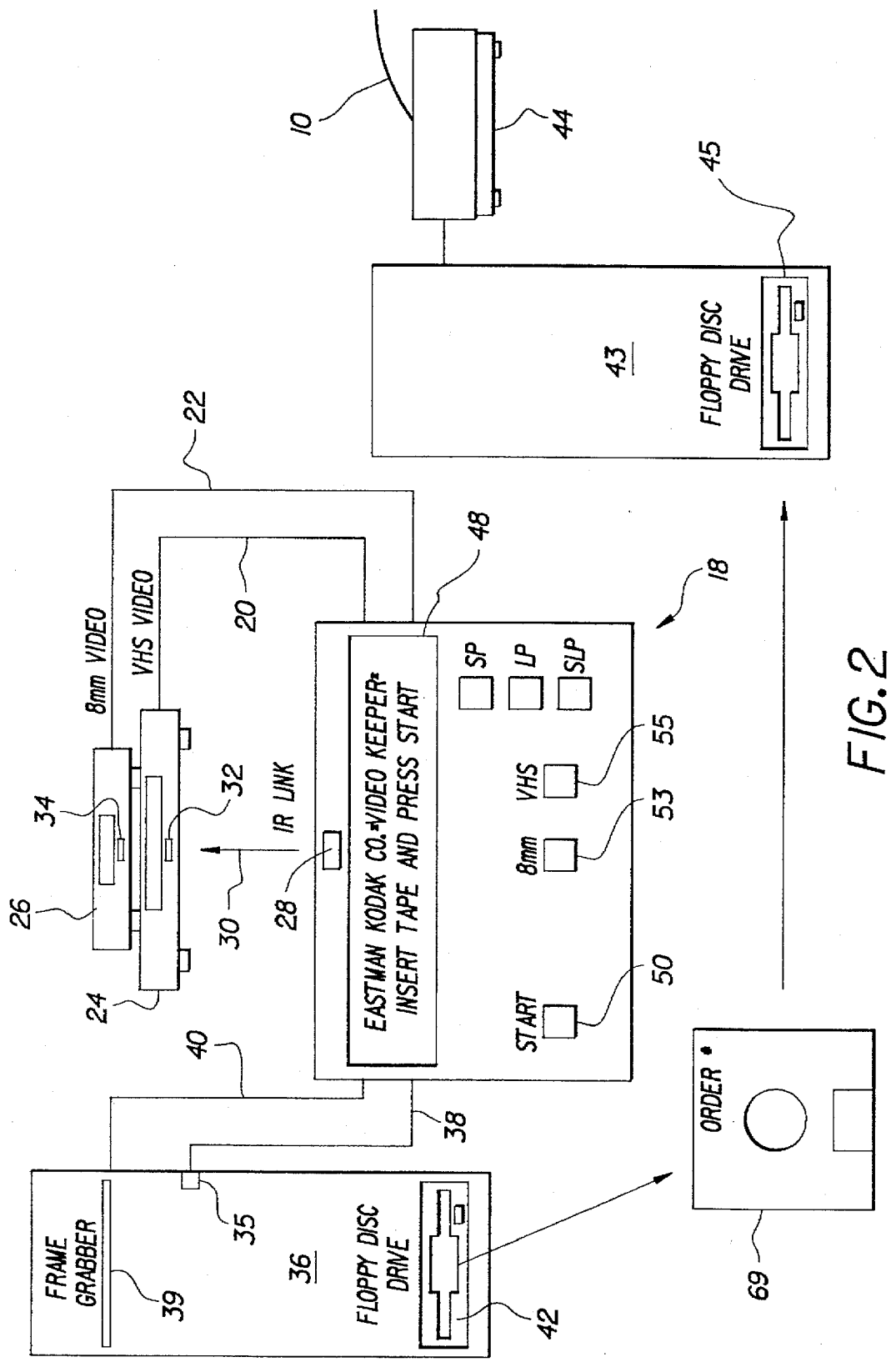
FIG. 2 is a schematic representation of apparatus used to create the index print of FIG. 1.

Turning now to FIG. 2, apparatus for creating the index print of FIG. 1 will be described. A controller 18, which includes a microprocessor (not shown), is connected by a pair of video cables 20, 22 respectively to VHS and 8 mm video tape players 24, 26. Players 24 and 26 are standard video tape players. Controller 18 also includes an infrared (IR) transmitter 28 for transmitting IR command signals 30 to players 24, 26 which each include an IR receiver 32,34 respectively.

Controller 18 is also connected to a standard RS232 communications port (com port) 35 on a computer 36, preferably an IBM 386 compatible computer or better, by a communications link 38. Controller 18 is further connected to a frame grabber board 39 in computer 36 by a video cable 40. Frame grabber board 39 is available from Video Associates Labs under the name of "Video View". Computer 36 includes a floppy disk drive 42.

A second computer 43, preferably a Macintosh Quadra 950, includes a floppy disk drive 45 and is connected to a hardcopy output device such as a thermal, xerographic or silver-halide digital printer 44 used to produce index print 10.

Figure 3:
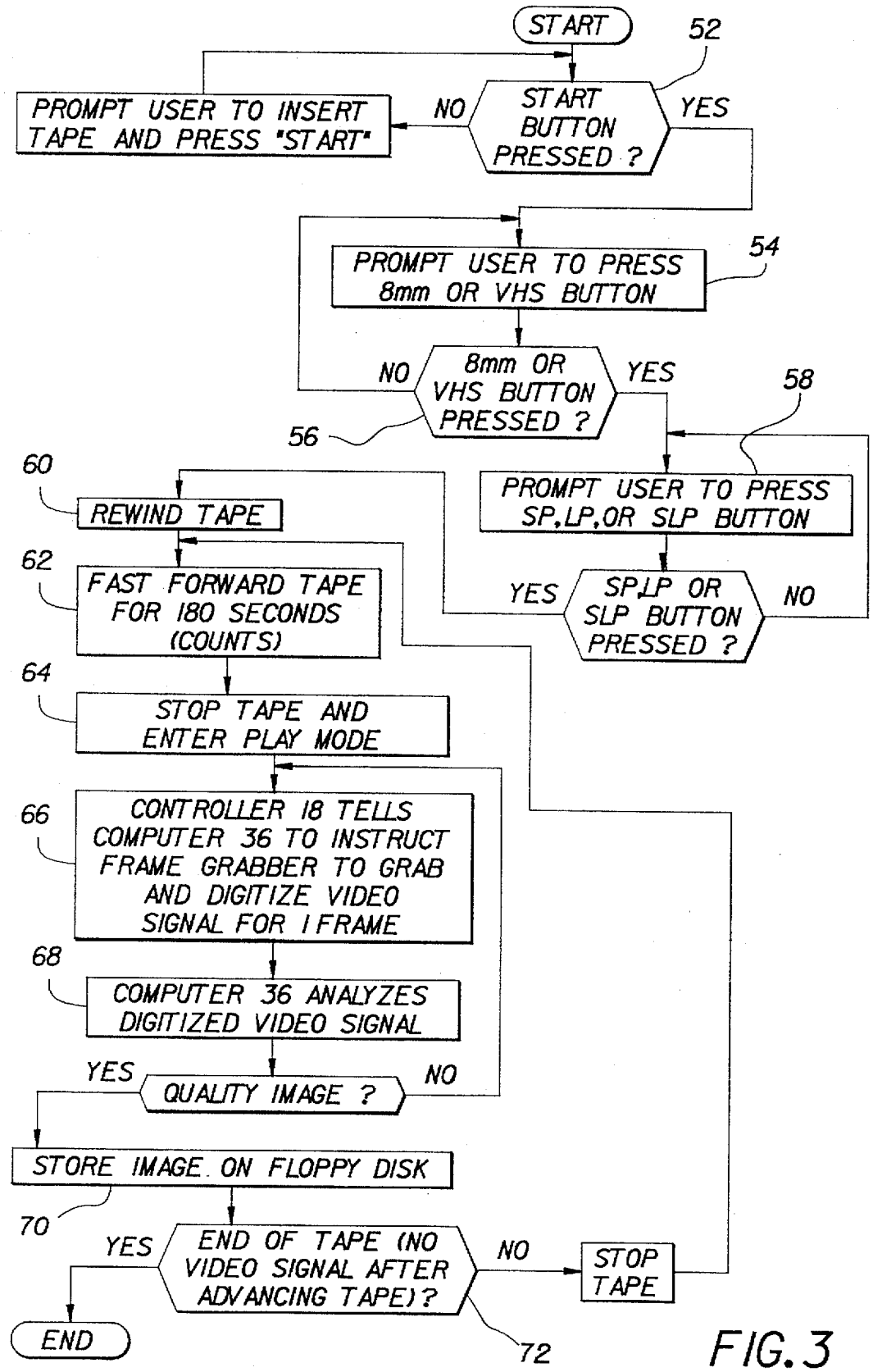
FIG. 3 is a logic flow diagram used by the apparatus of FIG. 2 to create the index print of FIG. 1.

Referring now to FIGS. 2 and 3, the logic flow of the operation of the controller 18 and computer 36 shown in FIG. 2 will be described. A liquid crystal display (LCD) 48 on controller 18 prompts the operator to insert a tape and press a start button 50 on controller 18. At a step 52 controller 18 checks if the start button is pressed. Assuming a tape has been inserted in player 24 and start button 50 has been pressed, controller 18 prompts the user to press an 8 mm or VHS button 53,55 respectively at a step 54. At a step 56 controller 18 checks if the "8 mm" or "VHS" button has been pressed.

Assuming the "VHS" button has been pressed, controller 18 prompts the user to press an "SP" (short play), "LP" (long play) OR "SLP" (super long play) button, or default button (not shown) at a step 58. The "SP", "LP" OR "SLP" buttons tell the controller what speed the tape was moving at when images were recorded on the MPIRM so that the images will be captured at three minute intervals regardless of the original recording speed. If the default button is pressed, then SP recorded images will be obtained every three minutes, "LP" recorded images will be obtained every six minutes and "SLP" images will be obtained every nine minutes.

Assuming the operator pressed the SP button, controller 18 then instructs tape player 24, via IR link 30, to rewind the cassette tape in the tape player at a step 60. The maximum amount of time it can possibly take to rewind a tape is allotted to rewind the tape. After the tape is rewound, controller 18 instructs tape player 24, via IR link 30, to fast forward the tape for a predetermined amount of time or number of counts, such as 180 seconds of recorded information (counts) at a step 62. Some tape players have a numerical display which indicates real time passage when the player is in the "play" mode (timer) while other tape players have a numerical display which increments at a rate different from real time passage when in the "play" mode (counter). Controller 18 then instructs tape player 24 to stop the tape and place the tape player in a "play" mode at a step 64.

Controller 18 now instructs the computer to cause frame grabber 39 to grab a video signal for one frame on the tape via video cables 20, 40 and controller 18 at a step 66. Frame grabber 39 then digitizes the video signal for the frame and stores the digitized signal on the computer's random access memory (RAM). Computer 36 now applies the digitized video signal to one or more image analysis algorithms, known to those skilled in the art, to determine whether or not the image meets a predetermined minimum quality standard at a step 68. One such algorithm is an Automatic Sharpness Detection algorithm used in the Agfa MSP Printer to determine if an image is out of focus.

If the image is a quality image, the image is stored on a floppy disk 69 by computer 36 at a step 70. The image is stored on the floppy disk with a file name which corresponds to its relative location on the video tape. If the image is not a quality image, frame grabber 39 grabs a new image five seconds or counts after the poor quality image was grabbed. This process is repeated for up to five images. Therefore, an imagette could appear on the index print representing an image 3:25 from the beginning of the tape.

If a quality image is not found after five tries, a prestored image, denoting the failure, is inserted onto the floppy disk. At a step 72, it is checked as to whether the end of the tape has been reached. If the end of the tape has not been reached, steps 62–72 are repeated. Once the end of the tape has been reached, the logic sequence ends.

Floppy disk 69, containing a plurality of images and their location on the video tape, is removed from computer 36 and loaded into a disk drive 45 of a computer 43. Computer 43 includes software, such as DOS Mounter, which allows a Macintosh computer to read disks with information stored in a DOS format. Computer 43 also includes software, such as Kodak Composite Machine software, which is used to capture, manipulate and print images. Computer 43, utilizes the Composite Machine software to combine the individual images on disk 69 into an index print format. The combined images are then enhanced for such characteristics as sharpness and color balance. Finally, the combined, enhanced images are output from computer 43 along with the location information for each image to output device 44 to produce index print 10. Optionally, the Kodak Composite Machine software or equivalent can be loaded on computer 36 where the image manipulation is accomplished prior to storing the images on floppy disk 69.

In the foregoing embodiment, a separate controller 18 is used in addition to computer 36 for at least the following reasons. First, computer 36 does not have an IR transmitter and, therefore cannot communicate directly with either tape player (most low-cost tape players do not have com ports). Second, such a controller has a minimum number of buttons and is much easier to operate than a standard computer keyboard.

The reason two computers 36,43 are used is that computer 43 and output device 44 are relatively expensive ($13,000.00) while computer 36, controller 18 and tape players 24,26 are relatively inexpensive ($2,000.00). As such, computer 43 and output device 44 are located at a central "print" location which is fed floppy disks from a multiplicity of "image capture" locations each having a computer 36, controller 18 and tape players 24,26. Such an arrangement reduces the overall cost of operating this system. An option to transporting the images via floppy disk from computer 36 to computer 43 is to transport the images via a communications link including a modem associated with each computer.

Figure 4:
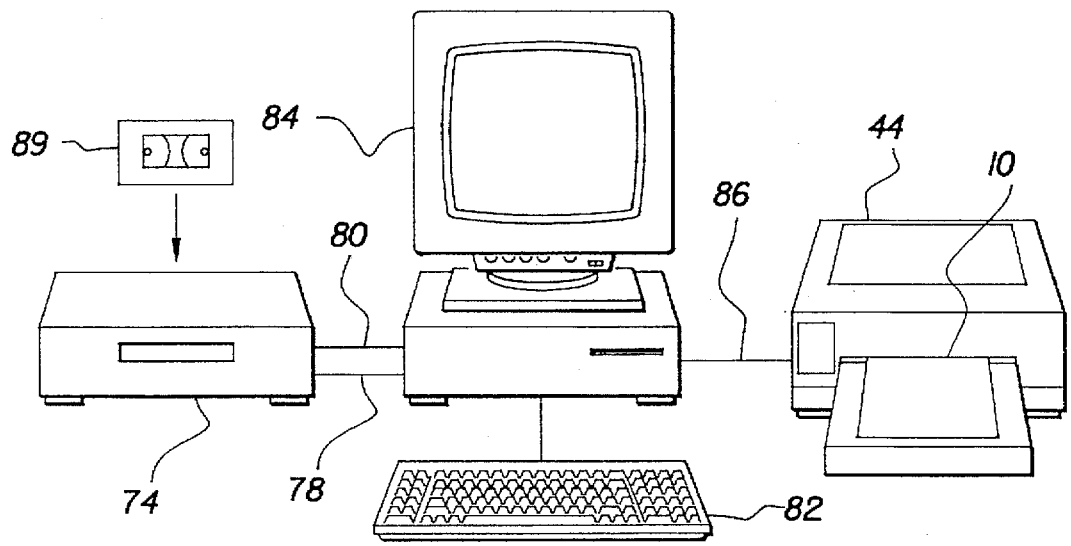
FIG. 4 is an alternative embodiment of apparatus used to create the index print of FIG. 1.

Turning now to FIG. 4, another embodiment of apparatus used to make index print 10 is shown. This embodiment utilizes a "smart" video tape player which includes a microprocessor and an RS-232 communications port (com port). The com port on tape player 74 is connected to a similar com port on a computer 76 by a communications link 78. As such, tape player 74 and computer 76 can communicate with each other. A video cable 80 connects tape player 74 with a frame grabber board in computer 76. A standard keyboard 82 is used by an operator to input instructions to computer 76 while a cathode ray tube (CRT) monitor 84 provides information to the operator. Computer 76 is connected to output device 44 by a SCSI link 86. All of the logic from controller 18 of the first embodiment is now embodied in computer 76.

Such an arrangement is much more automatic than the previous embodiment because tape player 74 can communicate information back to computer 76. For example, tape player 74 can tell computer 76 that a tape player has been loaded and the sequence can begin automatically without the operator having to press a start button. Further, tape player 74 may be able to tell computer 76 whether the images on the tape were recorded at SP, LP or SLP speed. This embodiment requires less equipment and is more compact.

Figure 5:
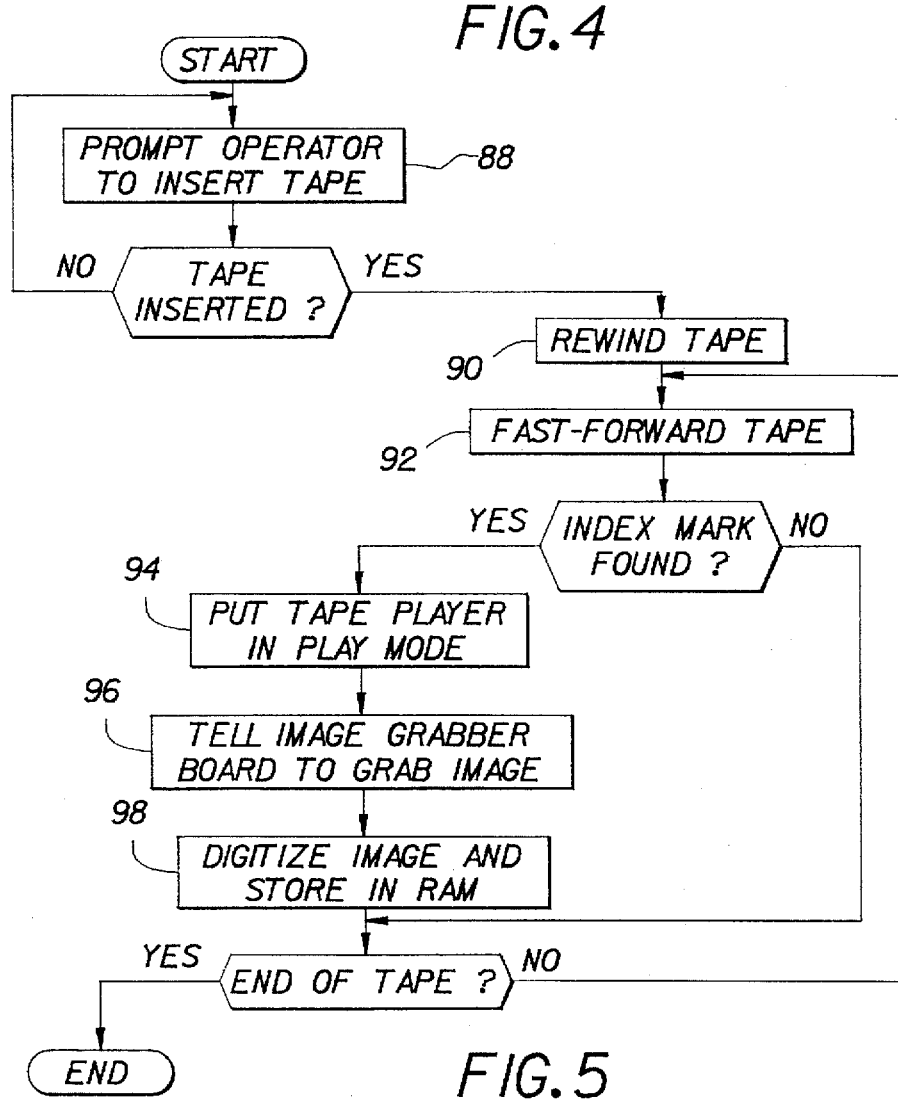
FIG. 5 is a logic flow diagram used by the apparatus of FIG. 4 to create the index print of FIG. 1

A further embodiment of the invention will be described with reference to FIGS. 4 and 5. Some video cassette recorders (VCRs) are equipped with an indexing feature which allows an operator to manually place a magnetic index mark on the non-image or sound area of the video tape for indexing purposes. This indexing feature provides a means to automatically locate a selected section of video tape for viewing or other purpose.

At a step 88 (FIG. 5) an operator is prompted on CRT to insert a tape 89 into player 74. Once a tape is inserted, the tape is rewound at a step 90 and then place in a fast-forward mode at a step 92. When an index mark is found, the tape player is put in a "play" mode at a step 94. The image grabber board is instructed by computer 76 to grab an image at step 96. This image is then digitized and stored along with its location on RAM at step 98. This process is continued until the end of the tape is reached. The images stored on RAM and their location on the tape are then used to create an index print via hard-copy output device 44. In this embodiment, a tape owner can decide which images will appear on the index print.

In a still further embodiment of the invention, an imagette for every scene on the video tape, along with the corresponding image's location, is provided on the index print. Such a method for locating an image from each scene on a video tape is disclosed in U.S. Pat. No. 4,920,423, issued in the name of Shiota on Apr. 24, 1990, which is hereby incorporated by reference. Once an image from the scene is selected, the image's location relative to the beginning of the tape is determined. An imagette corresponding to the image from the scene is created on the index print along with the images location on the tape.

The invention has been described with reference to a preferred embodiment. However, it will be appreciated that variations and modifications can be effected by a person of ordinary skill in the art without departing from the scope of the invention.

PARTS LIST

10 Index Print
12 Recording Sheet
14 Imagettes
16 Location Indicator
18 Controller
20 Video Cable
22 Video Cable
24 Video Tape Player
26 Video Tape Player
28 IR Transmitter
30 IR Command Signals
32 IR Receiver
34 IR Receiver
35 Com Port
36 Computer
38 Communications Link
39 Frame Grabber Board
40 Video Cable
42 Floppy Disk Drive
43 Computer
44 Printer
45 Floppy Disk Drive
48 LCD
50 Start Button
52 Logic Step
53 8 mm Button
54 Logic Step
55 VHS Button
56-68 Logic Steps
69 Floppy Disk
70,72 Logic Step
74 Tape Player
76 Computer -continued

PARTS LIST

78 Communications Link
80 Video Cable
82 Keyboard
84 CRT
86 SCSI Link
88 Logic Step
89 Video Tape
90-98 Logic Steps

We claim:

1. A method of making an index print having a plurality of imagettes representing images stored on a motion picture image recording medium, said plurality of imagettes being less in number than an entire number of images stored on the motion picture image recording medium, is characterized by steps of:

obtaining signals representing a plurality of images stored on said motion picture image recording medium, said obtaining signals including for each image steps of
(a) obtaining a signal representing an image stored on said motion picture image recording medium;
(b) analyzing said signal to determine if said image meets a predetermined minimum quality standard;
(c) allowing said signal to be used further if said image meets said predetermined minimum quality standard;
(d) moving said motion picture image recording medium a predetermined time or count to another image if said image does not meet said predetermined minimum quality standard;
(e) repeating steps (a) through (d) for a predetermined number of times for said another image until a quality image is located which meets said predetermined minimum quality standard;

determining where at least one of said plurality of images is located on said motion picture image recording medium;

using said signals to create a plurality of imagettes, corresponding to said plurality of images, on a recording sheet; and using location information from the determining step to provide an indicator on said recording sheet adjacent at least one of said imagettes, corresponding to said at least one image, for indicating where said at least one image is stored on said motion picture image recording medium.

2. The method of claim 1, wherein said using step is effective to provide an amount of time or count on said recording sheet adjacent each imagette that each corresponding image is located from a start point of said motion picture image recording medium.

3. The method of claim 1 wherein said obtaining step includes the step of;

analyzing said motion picture image recording medium to locate an index mark on said motion picture image recording medium; and obtaining a signal representing an image stored on said motion picture image recording medium at the location of said index mark.

4. The method of claim 1 wherein said obtaining step (a) includes steps of (a.1) obtaining a signal representing an image of a first scene stored on said motion picture image recording medium;

(a.2) analyzing said motion picture image recording medium to determine when said first scene has transitioned to a second scene; and (a.3) obtaining a signal representing an image of said second scene stored on said motion picture image recording medium.

5. A method of making an index print having a plurality of imagettes representing images stored on a motion picture image recording medium, said plurality of imagettes being less in number than an entire number of images stored on the motion picture image recording medium, is characterized by steps of: obtaining signals representing a plurality of images stored on said motion picture image recording medium by steps of:

(a) obtaining a signal representing an image stored on said motion picture image recording medium;

(b) analyzing said signal to determine if said image meets a predetermined minimum quality standard;

(c) allowing said signal to be used further if said image meets said predetermined minimum quality standard;

(d) moving said motion picture image recording medium a predetermined time or count to another image if said image does not meet said predetermined minimum quality standard;

(e) repeating steps (a) through (d) for a predetermined number of times for said another image until a quality image is located which meets said predetermined minimum quality standard;

determining where at least one of said plurality of images is located on said motion picture image recording medium;

storing said signals from said obtaining step and information location from said determining step on a transportable intermediate storage media via a first computer;

transporting said transportable intermediate storage media to a second computer;

using said signals on said transportable intermediate storage media via said second computer to create a plurality of imagettes, corresponding to said plurality of images, on a recording sheet; and using said location information on said transportable intermediate storage media via said second computer to provide an indicator on said recording sheet adjacent at least one of said imagettes, corresponding to said at least one image, for indicating where said at least one image is stored on said motion picture image recording medium.

6. A method of making an index print having a plurality of imagettes representing images stored on a motion picture image recording medium, said plurality of imagettes being less in number than an entire number of images stored on the motion picture image recording medium, is characterized by steps of:

obtaining signals representing a plurality of images stored on said motion picture image recording medium by steps of:

(a) obtaining a signal representing an image stored on said motion picture image recording medium;

(b) analyzing said signal to determine if said image meets a predetermined minimum quality standard;

(c) allowing said signal to be used further if said image meets said predetermined minimum quality standard;

(d) moving said motion picture image recording medium a predetermined time or count to another image if said image does not meet said predetermined minimum quality standard;

(e) repeating steps (a) through (d) for a predetermined number of lines for said another image until a quality image is located which meets said predetermined minimum quality standard;

determining where at least one of said plurality of images is located on said motion picture image recording medium;

transporting said signals from said obtaining step and information location from said determining step from a first computer via a communications link to a second computer;

using said signals via said second computer to create a plurality of imagettes, corresponding to said plurality of images, on a recording sheet; and using location information via said second computer to provide an indicator on said recording sheet adjacent at least one of said imagettes, corresponding to said at least one image, for indicating where said at least one image is stored on said motion picture image recording medium.

* * * * *